US010512113B2

(12) United States Patent
Asakura et al.

(10) Patent No.: US 10,512,113 B2
(45) Date of Patent: Dec. 17, 2019

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: Brother Kogyo Kabushiki Kaisha, Nagoya-shi, Aichi-ken (JP)

(72) Inventors: Hirotaka Asakura, Nagoya (JP); Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 59 days.

(21) Appl. No.: 15/855,191

(22) Filed: Dec. 27, 2017

(65) Prior Publication Data
US 2018/0184476 A1   Jun. 28, 2018

(30) Foreign Application Priority Data
Dec. 28, 2016 (JP) .................... 2016-256063

(51) Int. Cl.
 *H04W 76/15* (2018.01)
 *H04W 4/80* (2018.01)
 (Continued)

(52) U.S. Cl.
CPC ............ *H04W 76/15* (2018.02); *H04W 4/80* (2018.02); *H04W 12/00* (2013.01); *H04W 12/08* (2013.01); *H04W 76/16* (2018.02); *H04W 84/12* (2013.01)

(58) Field of Classification Search
None
See application file for complete search history.

(56) References Cited

U.S. PATENT DOCUMENTS

2013/0100855 A1* 4/2013 Jung ..................... H04W 12/06
 370/254
2014/0004793 A1* 1/2014 Bandyopadhyay .........................
 H04L 63/0428
 455/41.1

(Continued)

FOREIGN PATENT DOCUMENTS

JP   2014-216957 A   11/2014

OTHER PUBLICATIONS

Wi-Fi Alliance, "Wi-Fi Peer-to Peer (P2P) Technical Specification", Version 1.5, pp. 1-183, 2014.

*Primary Examiner* — Chi H Pham
*Assistant Examiner* — Vladislav Y Agureyev
(74) *Attorney, Agent, or Firm* — Banner & Witcoff, Ltd.

(57) ABSTRACT

A communication device may shift an operation state from a first operation state to a second operation state in response to establishment of a first wireless connection via a first wireless interface with an external device. In the first operation state, a first response signal indicating that a WPS process is inexecutable is sent to the external device in a case where a first request signal is received from the external device, and in the second operation state, a second response signal indicating that the WPS process is executable is sent to the external device. The communication device may establish a second wireless connection via a second wireless interface with the external device by executing the WPS process, in a case where the first request signal is received from the external device via the second wireless interface after the operation state has been shifted to the second operation state.

10 Claims, 9 Drawing Sheets

(51) Int. Cl.
*H04W 12/00* (2009.01)
*H04W 12/08* (2009.01)
*H04W 76/16* (2018.01)
*H04W 84/12* (2009.01)

(56) References Cited

U.S. PATENT DOCUMENTS

| | | | |
|---|---|---|---|
| 2014/0092425 A1* | 4/2014 | Park | G06F 3/1292 358/1.15 |
| 2014/0176980 A1* | 6/2014 | Asai | H04W 4/80 358/1.13 |
| 2014/0355048 A1* | 12/2014 | Kang | G06F 3/1292 358/1.15 |
| 2015/0193183 A1* | 7/2015 | Ichikawa | G06F 3/1292 358/1.15 |
| 2015/0215292 A1* | 7/2015 | Novicov | H04W 12/02 713/168 |
| 2018/0092138 A1* | 3/2018 | Tang | H04W 76/38 |
| 2018/0249313 A1* | 8/2018 | She | H04W 76/15 |
| 2018/0375870 A1* | 12/2018 | Bernsen | H04L 9/32 |

* cited by examiner

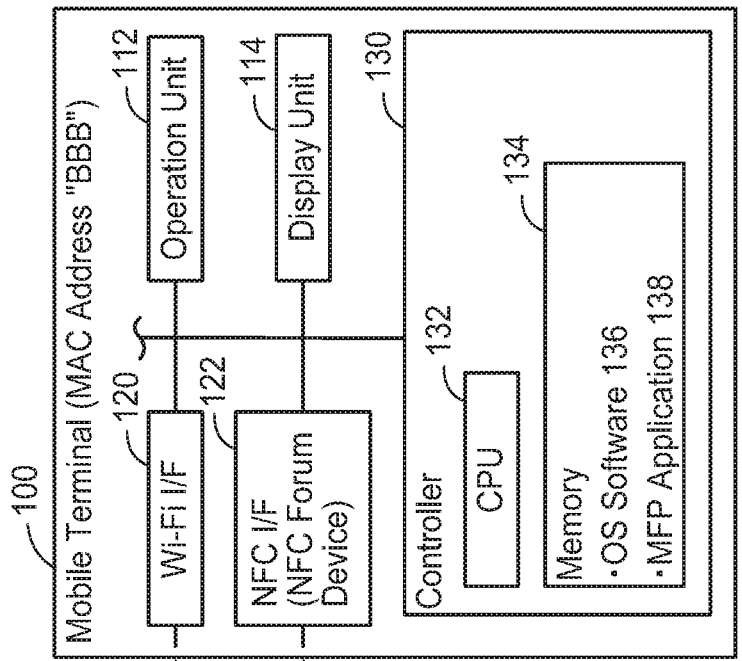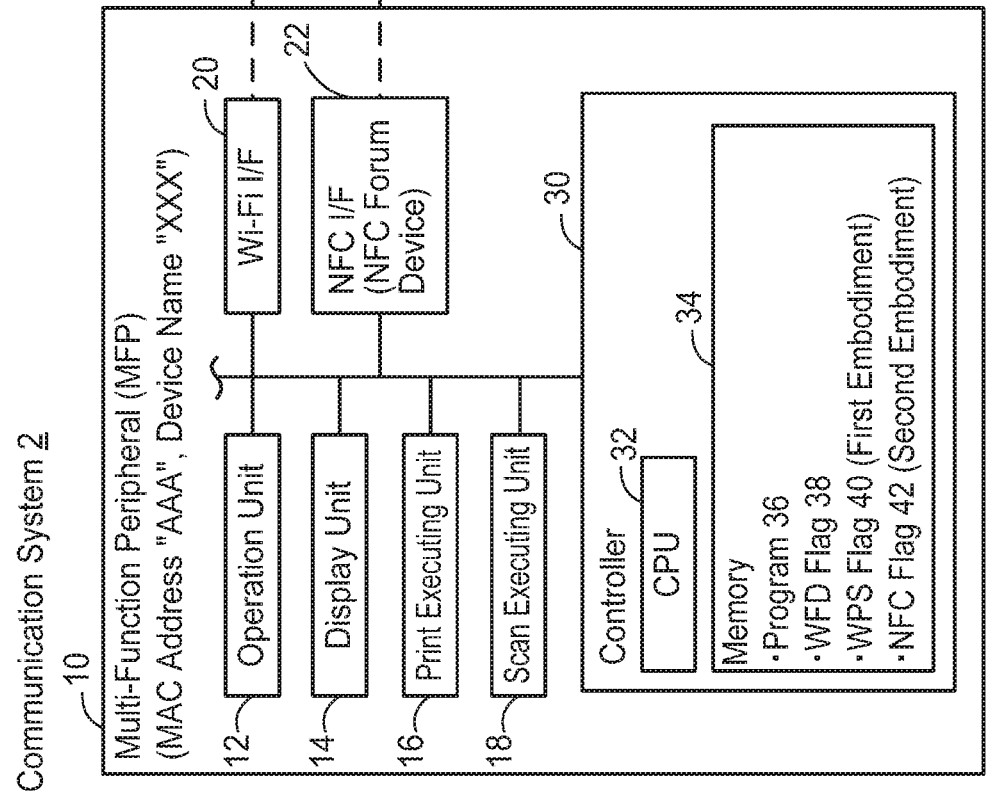
FIG. 1

FIG. 6 (Case B)

(Case C)

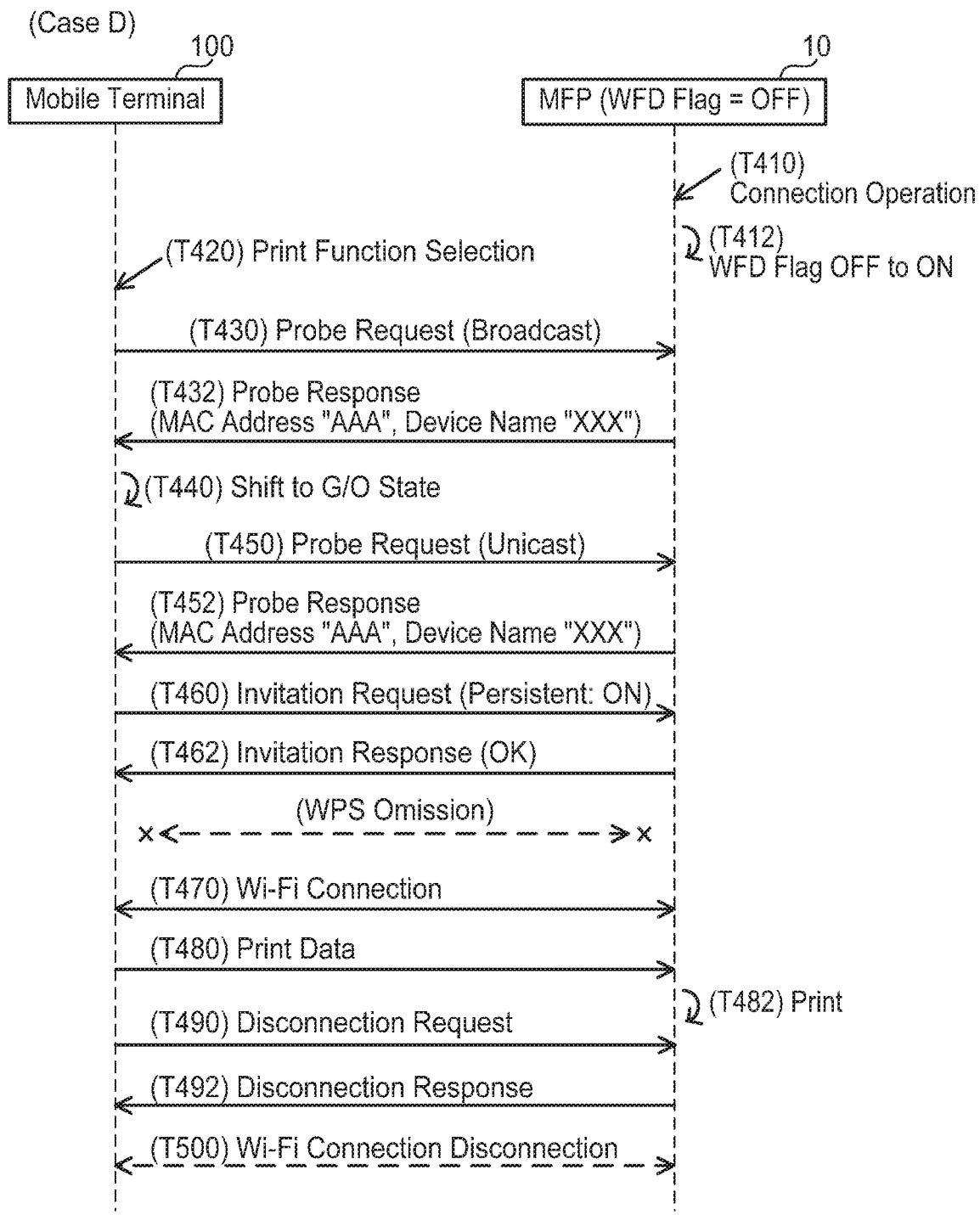

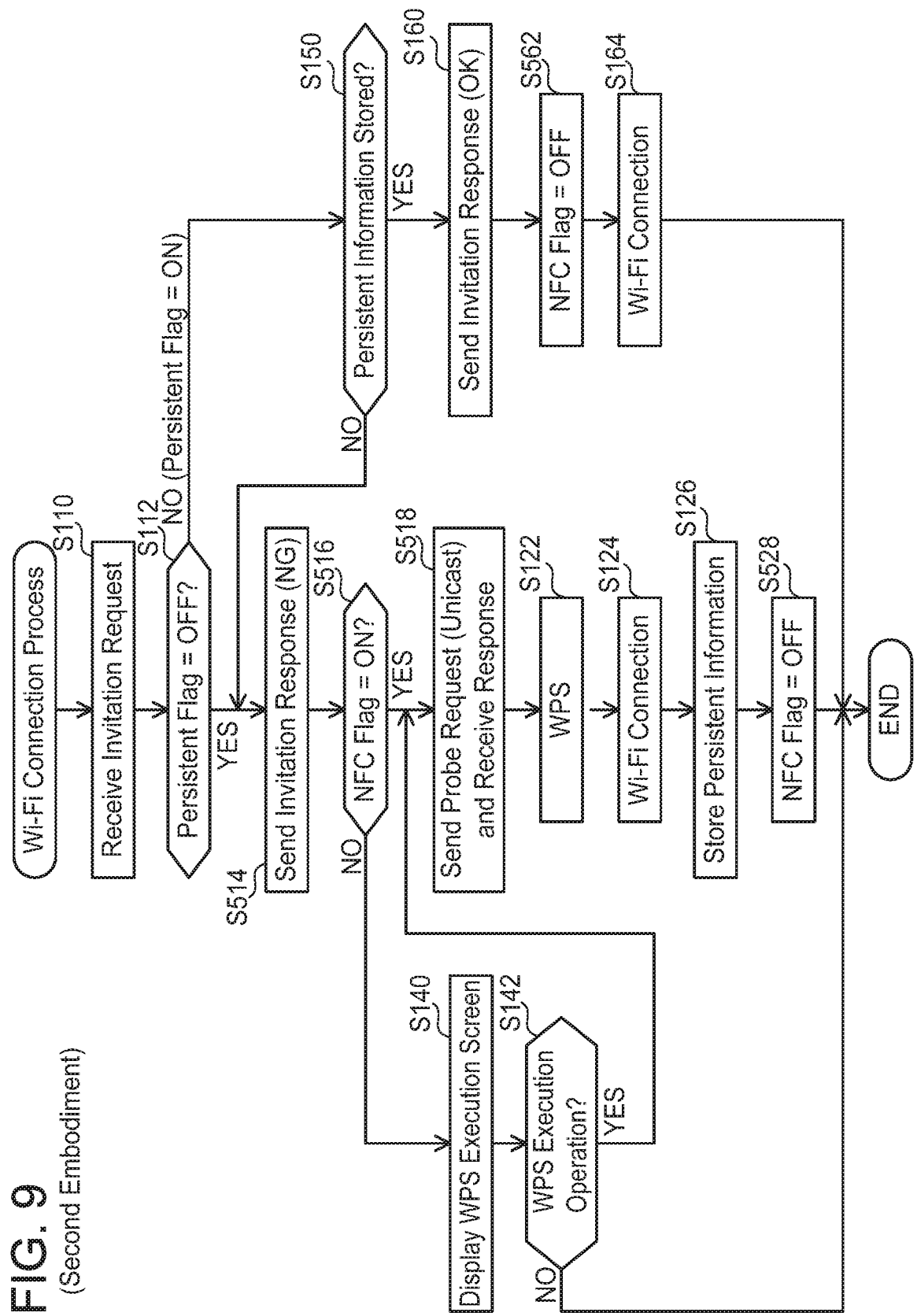
FIG. 9 (Second Embodiment)

COMMUNICATION DEVICE AND NON-TRANSITORY COMPUTER-READABLE RECORDING MEDIUM STORING COMPUTER-READABLE INSTRUCTIONS FOR COMMUNICATION DEVICE

TECHNICAL FIELD

The present disclosure discloses a communication device capable of executing a WPS (abbreviation of Wi-Fi Protected Setup) process so as to establish a wireless connection with an external device.

BACKGROUND ART

WPS (abbreviation of Wi-Fi Protected Setup) is known as a method for comparatively easily establishing a wireless connection according to the Wi-Fi scheme between a pair of devices. In the WPS, a user does not have to input, to a device, wireless setting information (e.g., password) for establishing a wireless connection. For example, in PBC (abbreviation of Push Button Configuration) scheme, which is one kind of WPS, when the user executes a button operation on each of the pair of devices, the communication of wireless setting information between the pair of devices is executed, and a wireless connection using the wireless setting information is established between the pair of devices.

SUMMARY

The present disclosure discloses a technique that may be improve user convenience for establishing a wireless connection between a communication device and an external device by using WPS.

A communication device may comprise a first wireless interface; a second wireless interface different from the first wireless interface; a processor; and a memory storing computer-readable instructions therein, the computer-readable instructions, when executed by the processor, causing the communication device to: shift an operation state of the communication device from a first operation state to a second operation state in response to establishment of a first wireless connection via the first wireless interface with an external device, wherein in the first operation state, a first response signal indicating that a WPS (abbreviation of Wi-Fi Protected Setup) process is inexecutable is sent to the external device in a case where a first request signal requesting an execution of the WPS process is received from the external device, and in the second operation state, a second response signal indicating that the WPS process is executable is sent to the external device in a case where the first request signal is received from the external device; and establish a second wireless connection via the second wireless interface with the external device by executing the WPS process, in a case where the first request signal is received from the external device via the second wireless interface after the operation state of the communication devices has been shifted to the second operation state due to the establishment of the first wireless connection with the external device.

Another communication device may comprise: a first wireless interface; a second wireless interface that is different from the first wireless interface; a display; a processor; and a memory storing computer-readable instructions therein, the computer-readable instructions, when executed by the processor, causing the communication device to: send a first signal indicating that a WPS (abbreviation of Wi-Fi Protected Setup) process is executable to an external device via the second interface without displaying a predetermined screen prompting to execute a predetermined operation for executing the WPS process on the display, in a case where a first request signal requesting an execution of the WPS process is received from the external device after a first wireless connection is established via the first wireless interface with the external device; establish a second wireless connection via the second wireless interface with the external device by executing the WPS process in response to sending the first signal to the external device; display the predetermined screen on the display in a case where the first request signal is received from the external device without establishing the first wireless connection with the external device; send a second signal different from the first signal to the external device via the second wireless interface, in a case where the predetermined operation is executed by a user, the second signal indicating that the WPS process is executable; and establish a third wireless connection via the second wireless interface with the external device by executing the WPS process in response to sending the second signal to the external device.

A control method, computer-readable instructions, and a non-transitory computer-readable recording medium in which the computer-readable instructions are stored for implementation of the communication device described above, are also novel and useful. Moreover, a communication system comprising the above-described communication device and external device is also novel and useful.

BRIEF DESCRIPTION OF THE DRAWINGS

FIG. 1 shows a configuration of a communication system.

FIG. 8 shows a sequence diagram of a case D in which a print operation is executed on the mobile terminal after case A or case B.

FIG. 9 shows a flowchart of a Wi-Fi connection process of a second embodiment.

EMBODIMENTS

Figure 2:
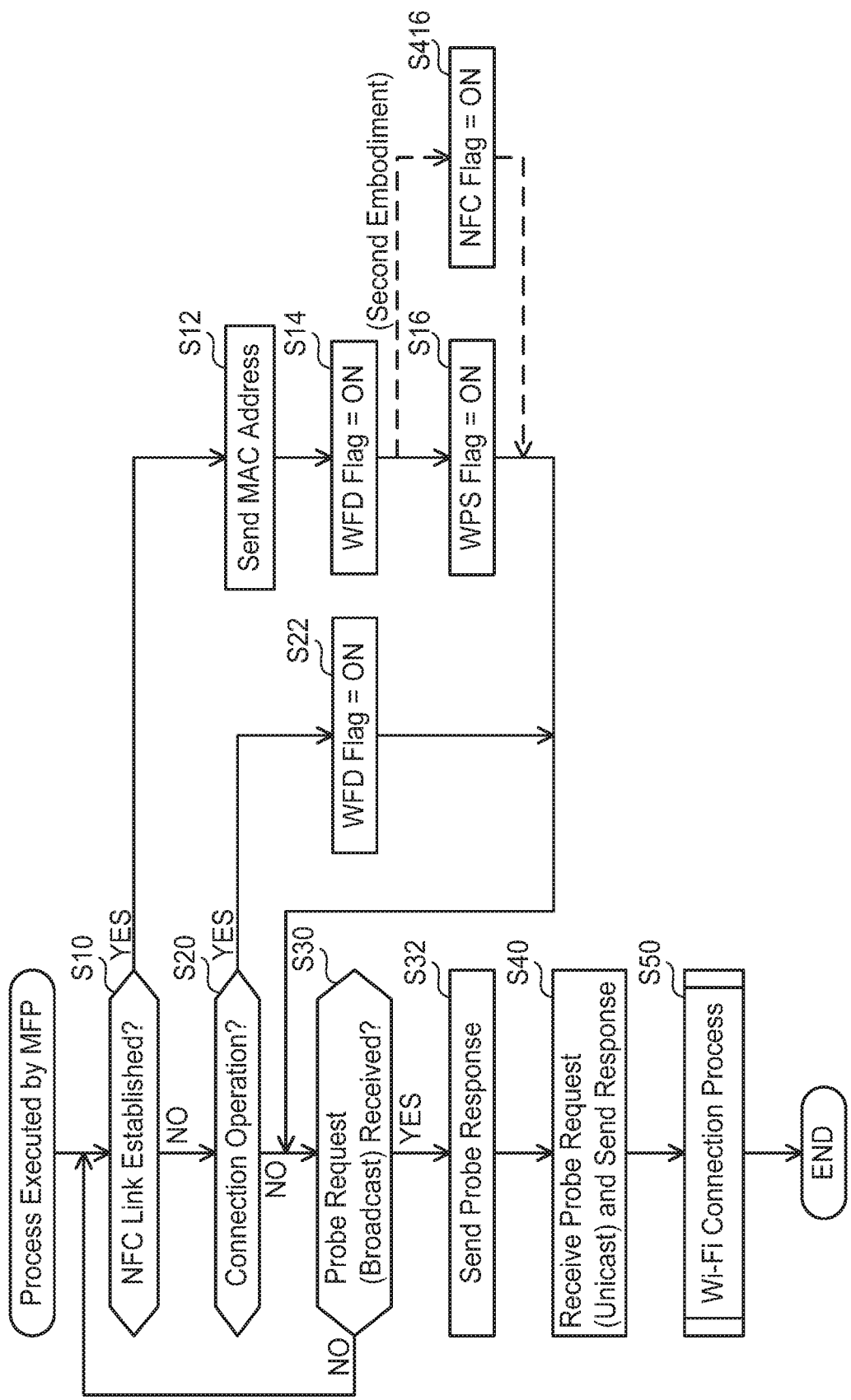
FIG. 2 shows a flowchart of a process executed by an MFP.

First Embodiment (Configuration of Communication System 2; FIG. 1)

As shown in FIG. 1, a communication system 2 comprises a multi-function peripheral 10 (called "MFP" below) and a mobile terminal 100. The MFP 10 and the mobile terminal 100 are capable of mutually executing a Wi-Fi communication, which is a wireless communication according to Wi-Fi scheme, and mutually executing an NFC (abbreviation of Near Field Communication) communication, which is a wireless communication according to NFC scheme.

(Configuration of MFP 10)

The MFP 10 is a peripheral device (e.g., a peripheral device of a PC etc.) capable of executing multiple functions including a print function and a scan function. A MAC address "AAA" and a device name "XXX" are allocated to the MFP 10. The MFP 10 comprises an operation unit 12, a display unit 14, a print executing unit 16, a scan executing unit 18, a Wi-Fi interface (interface is denoted as "I/F" below) 20, an NFC I/F 22, and a controller 30.

The operation unit 12 comprises a plurality of keys. A user can input various instructions to the MFP 10 by operating the operation unit 12. The display unit 14 is a display for displaying various information. The display unit 14 also functions as a so-called touch panel. That is, the display unit 14 also functions as an operation unit. Below, the operation unit 12 and the display unit 14 may collectively be referred to as "MFP operation unit". The print executing unit 16 is a printing mechanism such as an ink jet scheme, laser scheme, etc. The scan executing unit 18 is a scanning mechanism such as CCD, CIS, etc.

The Wi-Fi I/F 20 is an I/F for executing a Wi-Fi communication according to the Wi-Fi scheme. The Wi-Fi scheme is a wireless communication scheme based on, for example, the standard of IEEE (abbreviation of The Institute of Electrical and Electronics Engineers, Inc.) 802.11 and standards conforming thereto (e.g., 802.11a, 11b, 11g, 11n, etc.). The Wi-Fi I/F 20 supports, in particular, WFD (abbreviation of Wi-Fi Direct (registered trademark)) scheme developed by the Wi-Fi Alliance. The WFD scheme is a wireless communication scheme described in the standard document "Wi-Fi Peer-to-Peer (P2P) Technical Specification Version 1.5" created by the Wi-Fi Alliance. Further, the Wi-Fi I/F 20 supports WPS (abbreviation of Wi-Fi Protected Setup) formulated by the Wi-Fi Alliance. The WPS is a so-called automatic wireless setting or easy wireless setting, and is a technology capable of easily establishing a wireless connection according to the Wi-Fi scheme (called "Wi-Fi connection" below) between a pair of devices without a user inputting wireless setting information (e.g., password, authentication scheme, encryption scheme, etc.) for establishing the Wi-Fi connection. In particular, the Wi-Fi I/F 20 supports PBC (abbreviation of Push Button Configuration) scheme of the WPS. The PBC scheme is a scheme for establishing a Wi-Fi connection between a pair of devices in a case where a user executes a wireless connection operation (e.g., an operation of pushing button) on each of the pair of devices.

The NFC I/F 22 is an I/F for executing an NFC communication according to the NFC (abbreviation of Near Field Communication) scheme. The NFC scheme is a wireless communication scheme based on international standards such as ISO/IEC14443, 15693, 18092. It should be noted that an I/F called an NFC forum device, and an I/F called an NFC forum tag are known as types of I/F for executing an NFC communication. The NFC I/F 22 is an NFC forum device, and is capable of selectively operating in any of P2P (abbreviation of Peer To Peer) mode, R/W (abbreviation of Reader/Writer) mode, and CE (abbreviation of Card Emulation) mode.

Next, differences between the Wi-Fi I/F 20 and the NFC I/F 22 will be described. A communication speed of a Wi-Fi communication via the Wi-Fi I/F 20 (e.g., maximum communication speed is 11 to 600 Mbps) is faster than a communication speed of an NFC communication via the NFC I/F 22 (e.g., maximum communication speed is 100 to 424 Kbps). Further, a frequency of a carrier wave in a Wi-Fi communication via the Wi-Fi I/F 20 (e.g. 2.4 GHz band or 5.0 GHz band) is different from a frequency of a carrier wave in an NFC communication via the NFC I/F 22 (e.g. 13.56 MHz band). Further, a maximum distance with which a Wi-Fi communication via the Wi-Fi I/F 20 can be executed (e.g., approximately 100 m at maximum) is greater than a maximum distance with which an NFC communication via the NFC I/F 22 can be executed (e.g., approximately 10 cm at maximum).

The controller 30 comprises a CPU 32 and a memory 34. The CPU 32 executes various processes in accordance with a program 36 stored in the memory 34. The memory 34 is constituted of a volatile memory, a non-volatile memory, etc. Further, the memory 34 stores a WFD flag 38 and a WPS flag 40.

The WFD flag 38 is set to one of "ON" which means that the MFP 10 can execute an operation according to the WFD scheme, and "OFF" which means that the MFP 10 cannot execute the operation. Here, the operation according to the WFD scheme includes a communication of various signals (e.g., Invitation request and response thereto) according to the WFD scheme.

The WPS flag 40 is set to one of "ON", which means that the MFP 10 can execute a WPS process, and "OFF", which means that the MFP 10 cannot execute the WPS process. Here, the WPS process includes a communication of wireless setting information for establishing a Wi-Fi connection. A state in which the WPS flag 40 is set to "ON" is equal to a state in which the push button operation of the PBC scheme has been executed.

(Configuration of Mobile Terminal 100)

The mobile terminal 100 is a portable terminal device such as a mobile telephone, a smartphone, a PDA, a notebook PC, a tablet PC, a portable music playback device or a portable movie playback device. A MAC address "BBB" is allocated to the mobile terminal 100. The mobile terminal 100 comprises an operation unit 112, a display unit 114, a Wi-Fi I/F 120, an NFC I/F 122, and a controller 130.

The operation unit 112 comprises a plurality of keys. The user can input various instructions to the mobile terminal 100 by operating the operation unit 112. The display unit 114 is a display for displaying various information. The display unit 114 also functions as a so-called touch panel. That is, the display unit 114 also functions as an operation unit. Below, the operation unit 112 and the display unit 114 may collectively be termed "terminal operation unit". The Wi-Fi I/F 120 and the NFC I/F 122 are the same as the Wi-Fi I/F 20 and the NFC I/F 22 of the MFP 10, respectively.

The controller 130 comprises a CPU 132 and a memory 134. The CPU 132 executes various processes in accordance with an OS (abbreviation of Operating System) software 136 stored in the memory 134. The OS software 136 is software for controlling various basic operations of the mobile terminal 100. Further, the memory 134 stores an MFP application 138. The MFP application 138 is an application provided by a vendor of the MFP 10, and is installed in the mobile terminal 100 from, for example, a server on the Internet. The MFP application 138 is an application for establishing a Wi-Fi connection between the mobile terminal 100 and the MFP 10, and executing a communication of target data (e.g., print data, scan data) by using the Wi-Fi connection between the mobile terminal 100 and the MFP 10. Below, the MFP application 138 is simply called "application 138".

(Process Executed by MFP 10; FIG. 2)

Next, contents of a process executed by the CPU 32 of the MFP 10 in accordance with the program 36 will be described with reference to FIG. 2. When power of the MFP 10 is turned ON, each of the WFD flag 38 and the WPS flag 40 is set to "OFF". In this state, the CPU 32 executes the process of FIG. 2. Further, when the process of FIG. 2 ends, the WFD flag 38 is normally set to "ON", and the WPS flag 40 is set to "OFF". The CPU 32 executes the process of FIG. 2 even in this state.

In S10, the CPU 32 monitors whether an NFC link is established between the MFP 10 and the mobile terminal 100. When the user brings the mobile terminal 100 closer to the MFP 10, a distance between the NFC I/F 122 of the mobile terminal 100 and the NFC I/F 22 of the MFP 10 becomes shorter than the maximum distance with which an NFC link can be established (e.g., 10 cm). As a result, an NFC link between the MFP 10 and the mobile terminal 100 is established. In a case of acquiring information indicating that the NFC link has been established from the NFC I/F 22, the CPU 32 determines YES in S10, and proceeds to S12.

In S12, the CPU 32 sends the MAC address "AAA" of the MFP 10 to the mobile terminal 100 by using the established NFC link (i.e., via the NFC I/F 22).

In S14, the CPU 32 changes the WFD flag 38 from "OFF" to "ON". Thereby, the MFP 10 shifts to a device state of the WFD scheme, and consequently can execute the communication of various signals according to the WFD scheme. It should be noted that S14 is skipped when the WFD flag 38 is already in a state of "ON" before the execution of S14.

In S16, the CPU 32 changes the WPS flag 40 from "OFF" to "ON". Thereby, the MFP 10 shifts to a state where the push button operation of the PBC scheme has been executed, that is, a state where the WPS process is executable. When S16 ends, the process proceeds to S30.

Further, simultaneously with the monitoring of S10, in S20, the CPU 32 monitors whether the user has executed a connection operation on the MFP operation unit. The connection operation is an operation for instructing establishment of a Wi-Fi connection between the MFP 10 and the mobile terminal 100. In a case where the connection operation is executed by the user, the CPU 32 determines YES in S20 and, in S22, changes the WFD flag 38 from "OFF" to "ON". When S22 ends, the process proceeds to S30.

In S30, the CPU 32 monitors whether a Probe request is received from the mobile terminal 100 via the Wi-Fi I/F 20. The Probe request is a signal sent by broadcast from the mobile terminal 100 (i.e., a signal whose destination is not specified), and is a signal for searching for a device capable of establishing a Wi-Fi connection. Upon receiving the Probe request (YES in S30), in S32, the CPU 32 sends a Probe response including the MAC address "AAA" and the device name "XXX" to the mobile terminal 100 via the Wi-Fi I/F 20.

In S40, the CPU 32 receives a Probe request from the mobile terminal 100 via the Wi-Fi I/F 20. The Probe request includes the MAC address "AAA" of the MFP 10. That is, the Probe request is a signal sent by unicast from the mobile terminal 100 (i.e., a signal whose destination is specified), and is a signal for requesting the MFP 10 to establish a Wi-Fi connection. Upon receiving the Probe request, the CPU 32 sends a Probe response including the MAC address "AAA" and the device name "XXX" to the mobile terminal 100 via the Wi-Fi I/F 20. Thereby, the MFP 10 can inform the mobile terminal 100 that a Wi-Fi connection can be established with the MFP 10.

Figure 3:
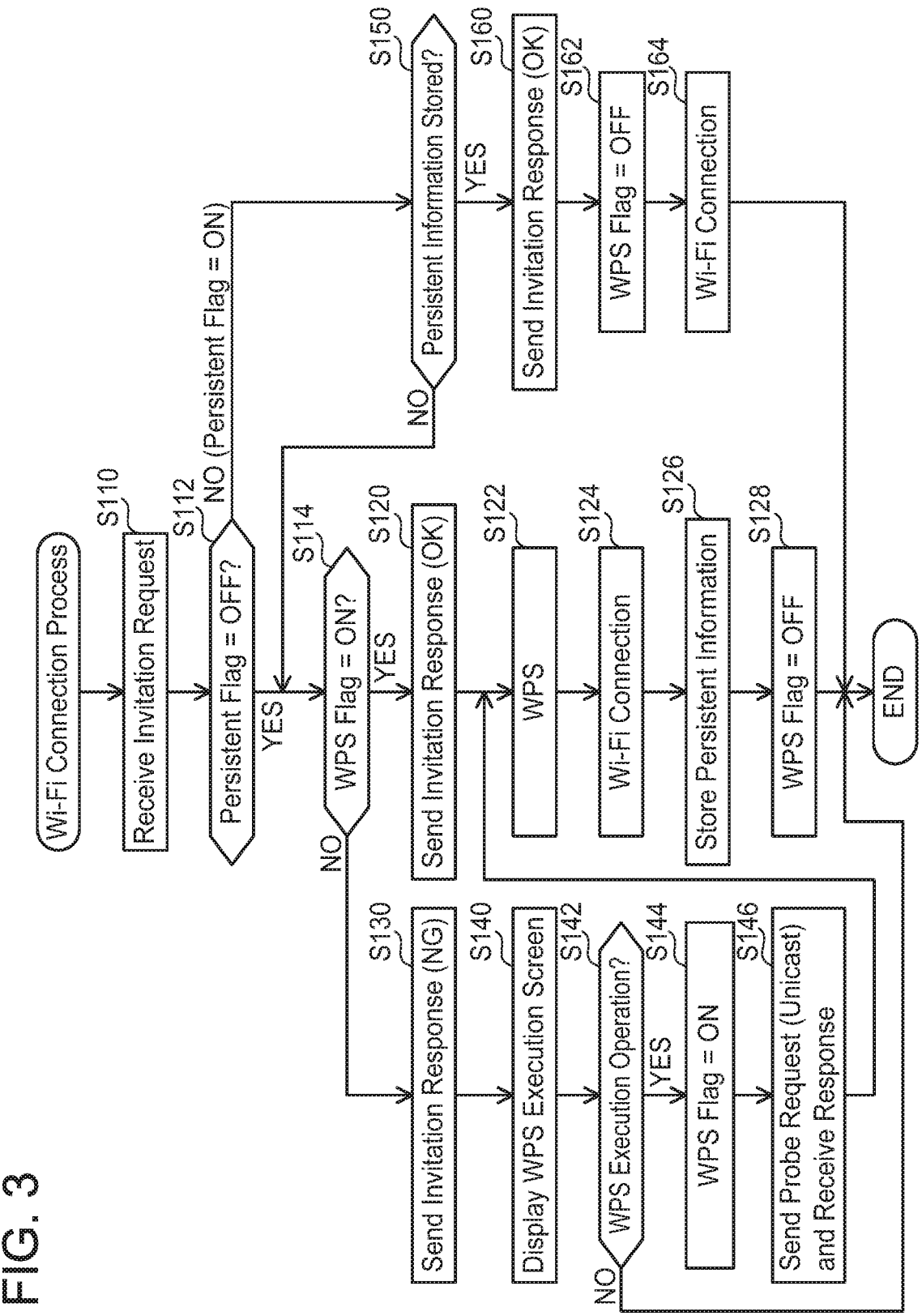
FIG. 3 shows a flowchart of a Wi-Fi connection process.

In S50, the CPU 32 executes a Wi-Fi connection process, for establishing a Wi-Fi connection with the mobile terminal 100 (FIG. 3). When S50 ends, the process of FIG. 2 ends.

(Wi-Fi Connection Process; FIG. 3)

Next, the Wi-Fi connection process executed in S50 of FIG. 2 will be described with reference to FIG. 3. The Wi-Fi connection process is a process for establishing a Wi-Fi connection with the mobile terminal 100, and to participate as a Client (called "CL" below) of the WFD scheme in a WFD network (called "WFDNW" below) in which the mobile terminal 100 operates as a Group Owner (i.e., called "G/O" below) of the WFD scheme. It should be noted that all communications executed in FIG. 3 are communications via the Wi-Fi I/F 20. Therefore, in the following description, the explanation "via the Wi-Fi I/F 20" will be omitted.

In S110, the CPU 32 receives an Invitation request including a Persistent flag from the mobile terminal 100. The Invitation request is a signal for requesting the MFP 10 to participate in the WFDNW in which the mobile terminal 100 operates as G/O. The Persistent flag is set to one of "ON" which requests establishment of a Wi-Fi connection by using the Persistent information without executing the WPS process, and "OFF" which requests establishment of a Wi-Fi connection by executing the WPS process. The Persistent information is wireless setting information used in the past for establishing a Wi-Fi connection between the MFP 10 and the mobile terminal 100, i.e., is wireless setting information used in a WFDNW formed in the past by the mobile terminal 100. For example, if the MFP 10 has an experience of participating in the WFDNW formed by the mobile terminal 100, the memory 34 of the MFP 10 is storing Persistent information including the MAC address "BBB" of the mobile terminal 100, an SSID of the WFDNW, and a password used in the WFDNW.

In S112, the CPU 32 determines whether the Persistent flag indicates "OFF". The CPU 32 proceeds to S114 in a case where the flag indicates "OFF" (YES in S112), and proceeds to S150 in a case where the flag indicates "ON" (NO in S112). It should be noted that below, the Invitation request including the Persistent flag indicating "ON (or OFF)" will be referred to as "Invitation request (ON (or OFF))".

In S114, the CPU 32 determines whether the WPS flag 40 indicates "ON". The case where the WPS flag 40 indicates "ON" is a case in which an Invitation request is received in response to the establishment of the NFC link with the mobile terminal 100 (YES in S10 of FIG. 2). The CPU 32 proceeds to S120 in a case where the WPS flag 40 indicates "ON" (YES in S114), and proceeds to S130 in a case where the WPS flag 40 indicates "OFF" (NO in S114).

In S120, the CPU 32 sends an Invitation response including OK information indicating that the WPS process is executable, to the mobile terminal 100.

In S122, the CPU 32 executes the WPS process. The WPS process includes a process of receiving wireless setting information for establishing a Wi-Fi connection with the mobile terminal 100. Accordingly, the CPU 32 receives, from the mobile terminal 100, wireless setting information including the MAC address "BBB" of the mobile terminal 100, the SSID of the WFDNW formed by the mobile terminal 100, and the password of the WFDNW.

In S124, the CPU 32 establishes a Wi-Fi connection with the mobile terminal 100 by using the wireless setting information received in S122. Thereby, the MFP 10 can participate as CL in the WFDNW in which the mobile terminal 100 operates as G/O.

In S126, the CPU 32 stores the wireless setting information received in S122 in the memory 34 as Persistent information.

In S128, the CPU 32 changes the WPS flag 40 from "ON" to "OFF". Thereby, the MFP 10 shifts to a state where the WPS process is inexecutable.

Although not shown, when S128 ends, the CPU 32 can execute communications of various data with the mobile terminal 100 by using the Wi-Fi connection established in S124 (i.e., by using the WFDNW). For example, the CPU 32 receives a function information request from the mobile terminal 100, and sends a function information response to the mobile terminal 100. The function information response includes information indicating that the MFP 10 is capable of executing the print function and the scan function. Thereby, the mobile terminal 100 can know the capability of the MFP 10. Further, for example, the CPU 32 can receive print data representing an image of a print target from the mobile terminal 100, and can send scan data obtained by scanning a document to the mobile terminal 100. Then, in a case where an operation for disconnecting the Wi-Fi connection with the MFP 10 is executed in the mobile terminal 100, the CPU 32 receives a disconnection request from the mobile terminal 100. Thereby, the Wi-Fi connection between the MFP 10 and the mobile terminal 100 is disconnected.

It should be noted that if the WPS flag 40 is not changed to "OFF" in S128, in a case of receiving an Invitation request (OFF) from a mobile terminal different from the mobile terminal 100 (YES in S114), the CPU 32 may send an Invitation response including OK information to the different mobile terminal (S120), execute the WPS process, and establish a Wi-Fi connection with the different mobile terminal (S122, S124). As a result, a communication with an undesired mobile terminal may be executed. According to the present embodiment, since the WPS flag 40 is changed to "OFF" in S128, in the case of receiving an Invitation request (OFF) from the different mobile terminal (NO in S114), the CPU 32 sends an Invitation response including NO information to the different mobile terminal (S130), causing the display unit 14 to display the WPS execution screen (S140). Consequently, it is possible to suppress automatic establishment of a Wi-Fi connection between the MFP 10 and the different mobile terminal, and the user of the mobile terminal 100 can cause communication using the Wi-Fi connection to be executed appropriately between the MFP 10 and the mobile terminal 100.

Further, in S130, the CPU 32 sends an Invitation response including NO information indicating that the WPS process is inexecutable to the mobile terminal 100.

In S140, the CPU 32 causes the display unit 14 to display a WPS execution screen prompting the user to execute the WPS execution operation (i.e., the push button operation of the PBC scheme).

In S142, the CPU 32 determines whether an operation for executing the WPS (called "WPS execution operation" below) has been executed by the user. In a case where it is determined that the WPS execution operation has been executed by the user (YES in S142), the CPU 32 proceeds to S144 and, in S144, changes the WPS flag 40 from "OFF" to "ON". On the other hand, in a case where it is determined that the WPS execution operation has not been executed by the user (NO in S142), the CPU 32 ends the process of FIG. 3.

In S146, the CPU 32 sends a Probe request including the MAC address "BBB" of the mobile terminal 100 to the mobile terminal 100. It should be noted that the MAC address "BBB" is included in the Invitation request received in S110. In S146, further, the CPU 32 receives a Probe response including the MAC address "BBB" from the mobile terminal 100 in response to sending the Probe request. Thereafter, the CPU 32 executes the processes of S122 to S128, and establishes a Wi-Fi connection with the mobile terminal 100. Thus, in the state where the WPS flag 40 is set to "OFF", even if an Invitation request (OFF) is received (YES in S112, NO in S114), the CPU 32 can appropriately execute the WPS process in response to the WPS execution operation being executed by the user, and consequently can appropriately establish a Wi-Fi connection with the mobile terminal 100.

Further, in S150, the CPU 32 determines whether the Persistent information including the MAC address "BBB" of the mobile terminal 100 in the Invitation request (ON) received in S110 is being stored in the memory 34. The CPU 32 proceeds to S160 in a case of determining that the Persistent information is being stored in the memory 34 (YES in S150), or proceeds to S114 in a case of determining that the Persistent information is not being stored in the memory 34 (NO in S150). That is, in the case where the Persistent information is not being stored in the memory 34, the CPU 32 can execute the WPS process to establish a Wi-Fi connection with the mobile terminal 100 (S122, S124).

In S160, the CPU 32 sends, to the mobile terminal 100, an Invitation response including the OK information indicating that a Wi-Fi connection can be established by using the Persistent information. Then, in S162, the CPU 32 changes the WPS flag 40 from "ON" to "OFF".

In S164, the CPU 32 establishes a Wi-Fi connection with the mobile terminal 100 by using the Persistent information (i.e., the wireless setting information) in the memory 34, without executing the WPS process. That is, by using the wireless setting information in the memory 34, the CPU 32 can establish the Wi-Fi connection with the mobile terminal 100 without receiving the wireless setting information from the mobile terminal 100. Since the WPS process is not executed, the Wi-Fi connection between the MFP 10 and the mobile terminal 100 is established quickly.

Although not shown, when S164 ends, the CPU 32 can execute communications of various data, such as print data and scan data, with the mobile terminal 100 by using the Wi-Fi connection established in S164 (i.e., by using the WFDNW). Then, in a case where an operation for disconnecting the Wi-Fi connection with the MFP 10 is executed on the mobile terminal 100, the CPU 32 receives a disconnection request from the mobile terminal 100. Thereby, the Wi-Fi connection between the MFP 10 and the mobile terminal 100 is disconnected.

Figure 4:
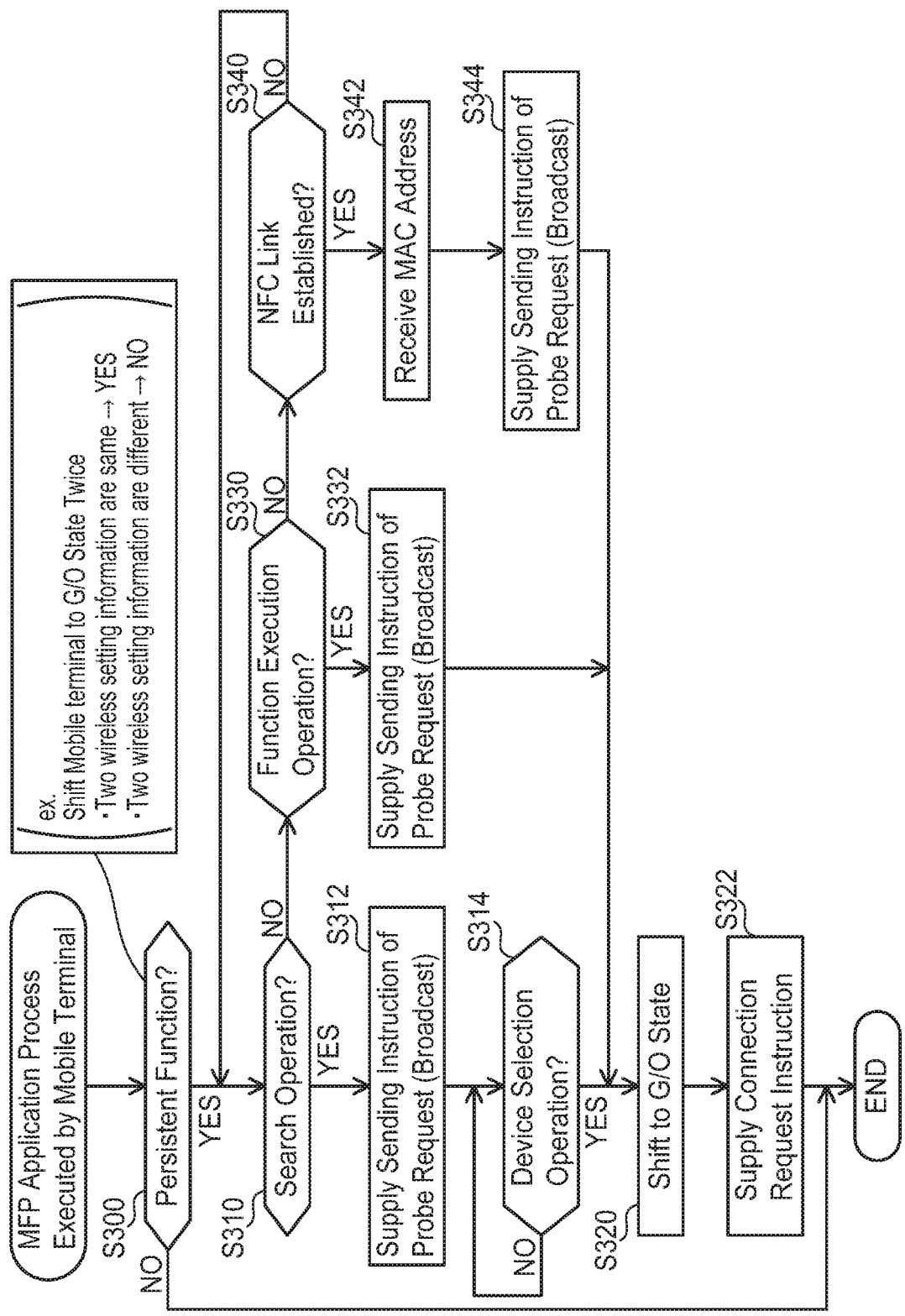
FIG. 4 shows a flowchart of an MFP application process executed by a mobile terminal.

(MFP Application Process Executed by Mobile Terminal 100; FIG. 4)

Next, contents of a process executed by the CPU 132 of the mobile terminal 100 in accordance with the application 138 will be described with reference to FIG. 4. In a case where an operation for activating the application 138 is executed on the terminal operation unit, the CPU 132 starts the process of FIG. 4. It should be noted, below, for the sake of convenience in the description, a subject of the process executed by the CPU 132 in accordance with the application 138, and a subject of the process executed by the CPU 132 in accordance with the OS software 136 are referred to as "application 138" and "OS 136", respectively, without referring to the CPU 132 as the subject.

In S300, the application 138 determines whether the mobile terminal 100 supports a Persistent function. The Persistent function is a function for, when a Wi-Fi connection is established, storing wireless setting information for establishing the Wi-Fi connection as the Persistent information, and thereafter re-establishing the Wi-Fi connection by using the Persistent information. The application 138 firstly shifts the operation state of the mobile terminal 100 from the device state to the G/O state of the WFD scheme. Thereby, the OS 136 generates first wireless setting information to be used in a first WFDNW in which the mobile terminal 100 operates as G/O. Next, the application 138 shifts the operation state of the mobile terminal 100 from the G/O state to the device state, and makes the first WFDNW disappear. Next, the application 138 again shifts the operation state of the mobile terminal 100 from the device state to the G/O state of the WFD scheme. Thereby, the OS 136 again generates second wireless setting information to be used in a second WFDNW in which the mobile terminal 100 operates as G/O. Here, in a case where the Persistent function is supported, the OS 136 again generates the same second wireless setting information as the first wireless setting information, and in a case where the Persistent function is not supported, the OS 136 generates the second wireless setting information different from the first wireless setting information. In the case where the second wireless setting information is same as the first wireless setting information, the application 138 determines that the Persistent function is supported (YES in S300), and proceeds to S310. On the other hand, in the case where the second wireless setting information is different from the first wireless setting information, the application 138 determines that the Persistent function is not supported (NO in S300), and ends the process of FIG. 4. It should be noted, the process of S300 described above is executed only at a time of initial activation of the application 138, and in the case of determining NO in S300, the application 138 causes the display unit 114 to display a screen indicating that the application 138 cannot be used. Thereby, the user can know that the application 138 cannot be used, and normally does not activate the application 138 again. On the other hand, in the case of determining YES in S300, the application 138 proceeds to S310 without executing S300 even if the application 138 is activated again. It should be noted, even in a case where the process of FIG. 4 is not executed, the WPS process between the mobile terminal 100 and the MFP 10 is executed by the user operating the PBC scheme push buttons of the mobile terminal 100 and the MFP 10.

In S310, the application 138 monitors whether a search operation is executed on the terminal operation unit. The search operation is an operation for searching for a device capable of establishing a Wi-Fi connection with the mobile terminal 100. In a case where the search operation is executed, the application 138 determines YES in S310, and proceeds to S312.

In S312, the application 138 supplies, to the OS 136, an instruction for sending a Probe request by broadcast. In this case, the OS 136 supplies the instruction to the Wi-Fi I/F 120. In response to sending of the Probe request, the OS 136 receives, from the MFP 10 via the Wi-Fi I/F 120, a Probe response including the MAC address "AAA" of the MFP 10 and the device name "XXX" of the MFP 10. Then, the OS 136 supplies the MAC address and the device name to the application 138.

In S314, the application 138 causes the display unit 114 to display the device name acquired from the OS 136, and monitors whether a device selection operation for selecting one of the device name is executed on the terminal operation unit. The device selection operation is an operation for selecting a target device with which the mobile terminal 100 is to establish a Wi-Fi connection. In a case where the device selection operation is executed, the application 138 determines YES in S314, and proceeds to S320. The following process will be described taking, as an example, a case where the device name "XXX" of the first MFP 10 is selected.

In S320, the application 138 shifts the operation state of the mobile terminal 100 from the device state to the G/O state. As a result, the OS 136 forms the WFDNW in which the mobile terminal 100 operates as the G/O, and generates the wireless setting information to be used in the WFDNW. It should be noted, in a modification, the application 138 may shift the operation state of the mobile terminal 100 from a state where SoftAP is not activated to a state where SoftAP is activated. In this case as well, a wireless network is formed in which the mobile terminal 100 operates as a parent station.

In S322, the application 138 supplies a connection request instruction to the OS 136. The connection request instruction includes an instruction for sending a Probe request including the MAC address "AAA" received together with device name "XXX" selected in S314, and an instruction for sending an Invitation request. Upon acquiring the connection request instruction, the OS 136 supplies, to the Wi-Fi I/F 120, the instruction for sending the Probe request including the MAC address "AAA". The OS 136 receives a Probe response from the MFP 10 via the Wi-Fi I/F 120 in response to sending of the Probe request. Then, the OS 136 determines whether Persistent information including the MAC address "AAA" of the MFP 10 is being stored in the memory 134. In a case of determining that the Persistent information is being stored, the OS 136 supplies an instruction for sending an Invitation request including the Persistent flag "ON" to the Wi-Fi I/F 120, or in a case of determining that the Persistent information is not being stored, the OS 136 supplies an instruction for sending an Invitation request including the Persistent flag "OFF" to the Wi-Fi I/F 120. The OS 136 receives an Invitation response from the MFP 10 via the Wi-Fi IF 120 in response to sending of the Invitation request.

Thereafter, the OS 136 executes a process for establishing a Wi-Fi connection with the MFP 10. For example, in the case where the Persistent information including the MAC address "AAA" of the MFP 10 is not being stored, the OS 136 executes the WPS process to establish a Wi-Fi connection with the MFP 10. In this case, the OS 136 stores, in the memory 134, the Persistent information including the MAC address "AAA" and the wireless setting information generated in S320. Further, for example, in the case where the Persistent information including the MAC address "AAA" of the MFP 10 is being stored, the OS 136 establishes a Wi-Fi connection with the MFP 10 by using the Persistent information, without executing the WPS process. When S322 ends, the process of FIG. 4 ends.

Thereafter, although not shown, by using the Wi-Fi connection, the application 138 can send the function information request to the MFP 10 and receive the function information response from the MFP 10, and execute a communication of print data or scan data with the mobile terminal 100.

Further, simultaneously with the monitoring of S310, in S330, the application 138 monitors whether a function execution operation is executed in the terminal operation unit. The execution of the function execution operation is permitted on condition that a Wi-Fi connection with the MFP 10 has been established in the past. That is, the application 138 accepts the input of the function execution operation on condition that Persistent information including the MAC address "AAA" of the MFP 10 selected in S314 in the past is being stored in the memory 134. When the function execution operation is executed (YES in S330), the application 138 causes the display unit 114 to display a function execution screen. The function execution screen is a screen for selecting a function (e.g., print function, scan function) to be executed by the MFP 10. When a function is selected in the function execution screen, the application 138 determines YES in S330, and proceeds to S332. S332 is the same as S312. When S332 ends, processes of S320, S322 are executed, and the Wi-Fi connection with the MFP 10 is established. It should be noted that, here, in S322, an instruction to send a Probe request including the MAC address "AAA" in the Persistent information is supplied to the OS 136.

Thereafter, although not shown, the application 138 sends an execution request of the function selected in the function execution screen to the MFP 10 by using the Wi-Fi connection. For example, the application 138 sends print data to the MFP 10, and causes the MFP 10 to execute the print function. Further, for example, the application 138 sends a scan request to the MFP 10, causes the MFP 10 to execute the scan function, and receives scan data from the MFP 10.

Further, simultaneously with the monitorings of S310 and S330, in S340, the application 138 monitors whether an NFC link is established between the MFP 10 and the mobile terminal 100. In a case of acquiring information indicating that an NFC link has been established from the NFC I/F 122, the application 138 determines YES in S340, and proceeds to S342.

In S342, the application 138 receives the MAC address "AAA" of the MFP 10 from the MFP 10 via the NFC I/F 122. S344 is the same as S312. When S332 ends, processes of S320, S322 are executed, and the Wi-Fi connection with the MFP 10 is established. Here, in S322, an instruction to send a Probe request including the MAC address "AAA" received in S342 is supplied to the OS 136. Once the Wi-Fi connection with the MFP 10 has been established, in the same manner as above, the application 138 can use the Wi-Fi connection to send the function information request to the MFP 10, and receive the function information response from the MFP 10 and execute communication of the print data or scan data with the mobile terminal 100.

(Specific Cases)

Next, specific cases A to D realized by the processes of FIG. 2 to FIG. 4 will be described with reference to FIG. 5 to FIG. 8. In each drawing, a thick arrow indicates NFC communication, and a thin arrow indicates Wi-Fi communication.

Figure 5:
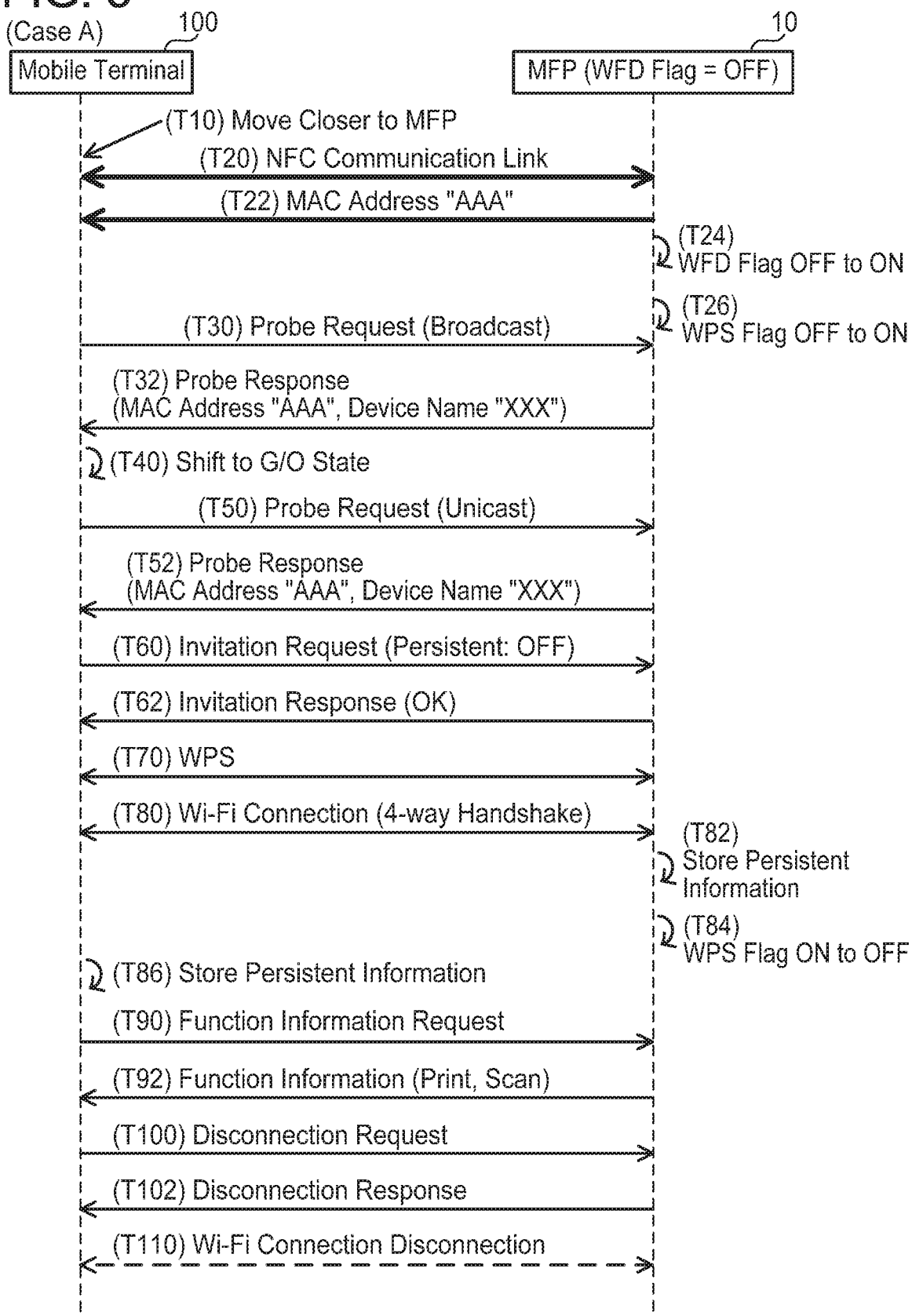
FIG. 5 shows a sequence diagram of a case A in which an NFC link is established between the mobile terminal and the MFP.

(Case A; FIG. 5)

In an initial state of case A, the WFD flag 38 of the MFP 10 is set to "OFF". Further, there is no experience of a Wi-Fi connection having been established between the MFP 10 and the mobile terminal 100, and Persistent information is not being stored in either the MFP 10 or the mobile terminal 100. Further, the application 138 has already been installed in the mobile terminal 100, and it has been determined that the mobile terminal 100 supports the Persistent function (YES in S300).

When the user moves the mobile terminal 100 closer to the MFP 10 in T10, an NFC link between the MFP 10 and the mobile terminal 100 is established in T20 (YES in S10 of FIG. 2, YES in S340 of FIG. 4).

In T22, the MFP 10 sends the MAC address "AAA" to the mobile terminal 100 by using the NFC link (S12 of FIG. 2). Then, in T24, the MFP 10 changes the WFD flag 38 from "OFF" to "ON" (S114) and, in T26, changes the WPS flag 40 from "OFF" to "ON" (S16).

Upon receiving the MAC address "AAA" from the MFP 10 by using the NFC link in T22 (S342 of FIG. 4), the mobile terminal 100 sends a Probe request by broadcast in T30 (S344).

Upon receiving the Probe request from the mobile terminal 100 in T30 (YES in S30 of FIG. 2), in T32, the MFP 10 sends a Probe response including the MAC address "AAA" and the device name "XXX" to the mobile terminal 100 (S32).

Upon receiving the Probe response from the MFP 10 in T32 (S344 of FIG. 4), in T40, the mobile terminal 100 shifts to the G/O state (S320). Thereby, the mobile terminal 100 forms a WFDNW, and generates wireless setting information to be used in the WFDNW. Then, in T50, the mobile terminal 100 sends a Probe request including the MAC address "AAA" to the MFP 10 (S322).

Upon receiving the Probe request from the mobile terminal 100 in T50, the MFP 10 sends a Probe response including the MAC address "AAA" and the device name "XXX" to the mobile terminal 100 in T52 (S40 of FIG. 2).

Upon receiving the Probe response from the MFP 10 in T52, the mobile terminal 100 determines that Persistent information including the MAC address "AAA" of the MFP 10 is not being saved, and sends an Invitation request (OFF) to the MFP 10 in T60 (S322 of FIG. 4).

Upon receiving the Invitation request (OFF) from the mobile terminal 100 in T60 (S110 of FIG. 3), the MFP 10 determines that the Persistent flag is "OFF" (YES in S112), determines that the WPS flag 40 is "ON" (YES in S114), and sends an Invitation response including OK information to the mobile terminal 100 in T62 (S120).

In T70, the WPS process between the MFP 10 and the mobile terminal 100 is executed (S122 of FIG. 3). Specifically, the MFP 10 receives, from the mobile terminal 100, wireless setting information including the SSID "YYY" of the WFDNW and the password "ppp" of the WFDNW. Then, in T80, communication of a 4-way Handshake, etc. between the MFP 10 and the mobile terminal 100 is executed, and the Wi-Fi connection is established (S124).

In T82, the MFP 10 stores, in the memory 34, Persistent information including the MAC address "BBB" of the mobile terminal 100, and the wireless setting information received in T70 (S126 of FIG. 2) and, in T84, changes the WPS flag 40 to "OFF" (S128).

Further, in T86, the mobile terminal 100 stores, in the memory 134, Persistent information including the MAC address "AAA" of the MFP 10, and the wireless setting information sent in T70. Then, in T90, the mobile terminal 100 sends, to the MFP 10, a function information request for confirming functions executable by the MFP 10 by using the Wi-Fi connection and, in T92, receives a function information response indicating that the print function and the scan function are executable from the MFP 10 by using the Wi-Fi connection.

In T100, the mobile terminal 100 sends a disconnection request to the MFP 10 by using the Wi-Fi connection and, in T102, receives a disconnection response from the MFP 10 by using the Wi-Fi connection. Thereby, the Wi-Fi connection between the MFP 10 and the mobile terminal 100 is disconnected in T110.

(Effect of Case A)

The MFP 10 changes the WPS flag 40 from "OFF" to "ON" (T26) triggered by the establishment of the NFC link with the mobile terminal 100 (T20 of FIG. 5). Thereby, the MFP 10 shifts to the state where an Invitation response (OK) can be sent. As a result, even if the PBC scheme button operation is not executed, in the case of receiving an Invitation request (OFF) from the mobile terminal 100 (T60), the MFP 10 sends an Invitation response (OK) to the mobile terminal 100 (T62), executes the WPS process (T70), and establishes a Wi-Fi connection with the mobile terminal 100 (T80). Accordingly, it is possible to improve user convenience for establishing a Wi-Fi connection between the MFP 10 and the mobile terminal 100 by using the WPS process.

Figure 6:
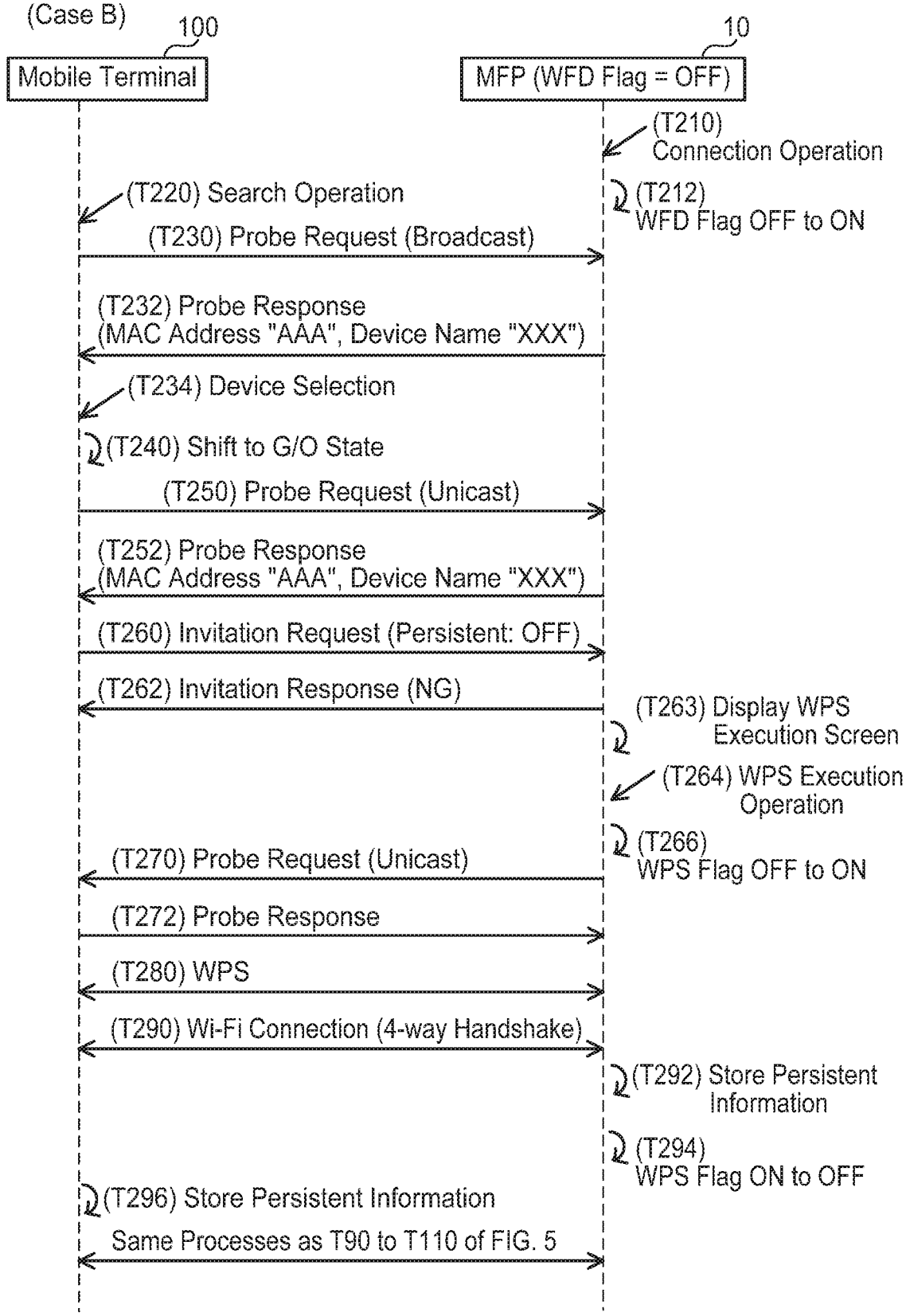
FIG. 6 shows a sequence diagram of a case B in which a search operation is executed on the mobile terminal.

(Case B; FIG. 6)

An initial state of case B is the same as the initial state of case A. In case B, the establishment of the Wi-Fi connection is not triggered by the establishment of the NFC link, but the establishment of the Wi-Fi connection is triggered by the connection operation (YES in S20 of FIG. 2) being executed on the MFP 10 and the search operation (S310 of FIG. 4) being executed on the mobile terminal 100.

Upon the connection operation being executed on the MFP 10 by the user in T210 (YES in S20 of FIG. 2), in T212, the MFP 10 changes the WFD flag 38 from "OFF" to "ON" (822).

Upon the search operation being executed on the mobile terminal 100 by the user in T220 (YES in S310 of FIG. 4), T230 and T232 are executed as in T30 and T32 of FIG. 5 (S30, S32 of FIG. 2, S312 of FIG. 4). Then, the mobile terminal 100 displays the device name "XXX" of the MFP 10 and, in T234, accepts selection of the device name "XXX" (YES in S314). T240 to T260 are the same as T40 to T60 of FIG. 5 (S40 of FIG. 2, S110 of FIG. 3, S320, S322 of FIG. 4).

Upon receiving an Invitation request (OFF) from the mobile terminal 100 in T260 (S110 of FIG. 3), the MFP 10 determines that the Persistent flag is "OFF" (YES in S112), determines that the WPS flag 40 is "OFF" (NO in S114), sends an Invitation response including NG information to the mobile terminal 100 in T262 (S130), and displays the WPS execution screen in T263 (S140). When the WPS execution operation is executed on the display unit 14 by the user in T264 (YES in S142), in T266, the MFP 10 changes the WPS flag 40 from "OFF" to "ON" (S144) and, in T270, sends a Probe request including the MAC address "BBB" of the mobile terminal 100 to the mobile terminal 100 (S146).

Upon receiving the Probe request from the MFP 10 in 1270, the mobile terminal 100 sends a Probe response to the MFP 10 in T272. T280 to T296 are the same as T70 to T86 of FIG. 5.

(Effect of Case B)

In the case of receiving the Invitation request (OFF) from the mobile terminal 100 (T260) without establishment of an NFC link with the mobile terminal 100, the MFP 10 displays the WPS execution screen on the display unit 14 (T262) and, in a case where the WPS execution operation is executed by the user on the MFP operation unit (T264), changes the WPS flag 40 from "OFF" to "ON" (T266). Then, the MFP 10 executes the WPS process (T280), and establishes a Wi-Fi connection with the mobile terminal 100 (T290). Accordingly, even in a case where an NFC link with the mobile terminal 100 is not established, it is possible to establish a Wi-Fi connection between the MFP 10 and the mobile terminal 100 by the user executing the WPS execution operation.

Figure 7:
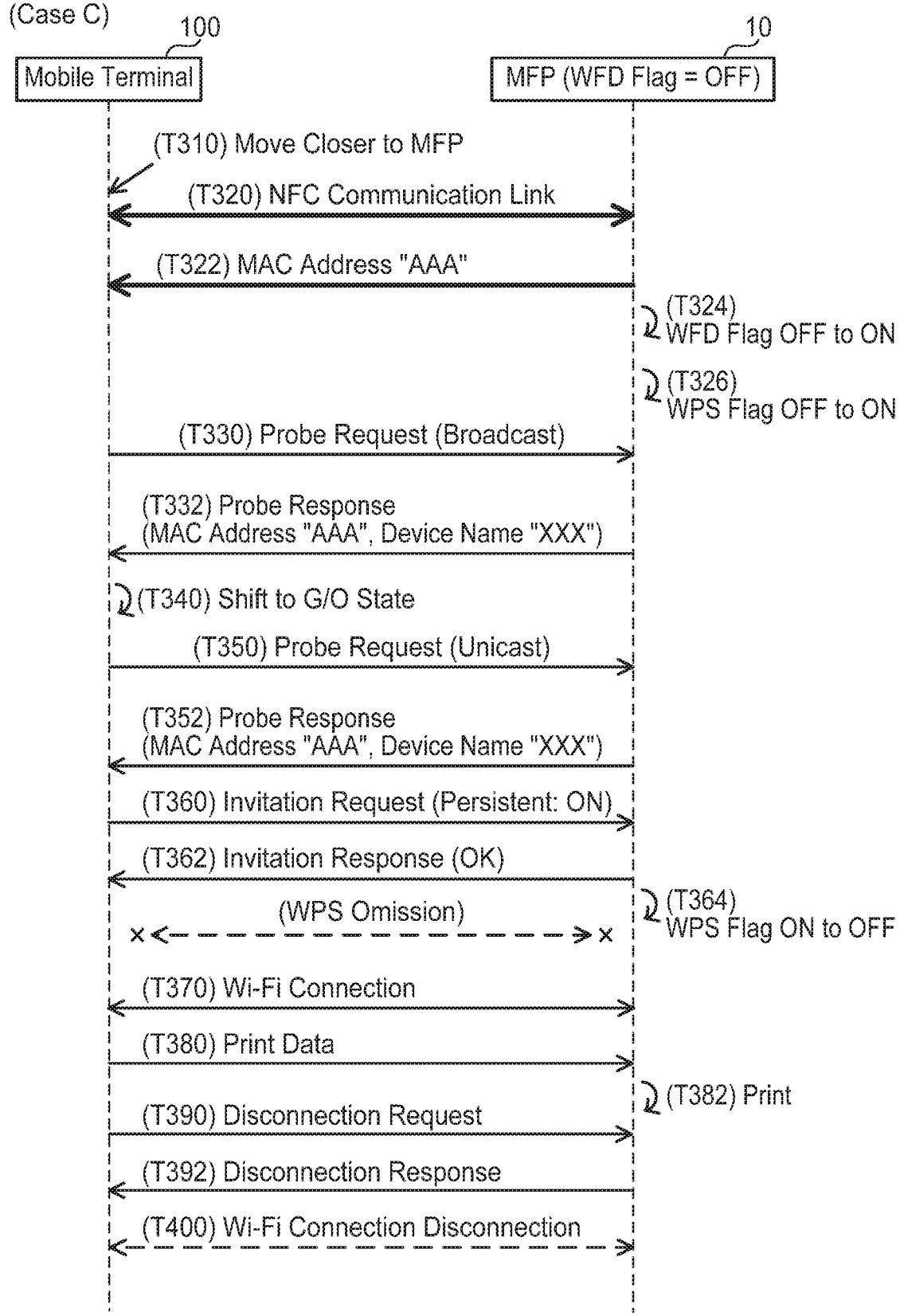
FIG. 7 shows a sequence diagram of a case C in which an NFC link is established between the mobile terminal and the MFP after case A or case B.

(Case C; FIG. 7)

Case C is a state after execution of case A or case B, that is, a state where Persistent information is being stored in each of the MFP 10 and the mobile terminal 100. Further, an operation for changing the WFD flag 38 to "OFF" is executed on the MFP 10, and consequently the WFD flag 38 is turned "OFF".

T310 to T352 are the same as T10 to T52 of FIG. 5. The mobile terminal 100 determines that Persistent information including the MAC address "AAA" of the MFP 10 is being stored and, in T360, sends an Invitation request (ON) to the MFP 10 (S322 of FIG. 4).

Upon receiving the Invitation request (ON) from the mobile terminal 100 in T360 (S110 of FIG. 3), the MFP 10 determines that the Persistent flag is "ON" (NO in S112), determines that the Persistent information is being stored (YES in S150) and, in T362, sends an Invitation response including OK information to the mobile terminal 100 (S160). Then, in T364, the MFP 10 changes the WPS flag 40 from "ON" to "OFF" (S162).

In T370, by using the Persistent information, the MFP 10 and the mobile terminal 100 establish a Wi-Fi connection without executing the WPS process (S164 of FIG. 2).

For example, in a case where a print execution instruction for causing the MFP 10 to execute the print function is input to the mobile terminal 100, in T380, the MFP 10 receives print data from the mobile terminal 100 by using the Wi-Fi connection and, in T382, executes printing of an image represented by the print data. It should be noted that the print execution request may, for example, be input to the mobile terminal 100 before bringing the mobile terminal 100 closer to the MFP 10 in T310, or may be input to the mobile terminal 100 after the establishment of the Wi-Fi connection in T370. T390 to T400 are the same as T100 to T110 of FIG. 5.

(Effect of Case C)

In a case of receiving the Invitation request (ON) from the mobile terminal 100 (T360 of FIG. 7) after the establishment of the NFC link with the mobile terminal 100, in a state where the Persistent information is being stored, the MFP 10 establishes a Wi-Fi connection with the mobile terminal 100 without executing the WPS process by using the Persistent information in the memory 34 (T370). Since the WPS process is omitted, the Wi-Fi connection is quickly established between the MFP 10 and the mobile terminal 100.

(Case D; FIG. 8)

An initial state of Case D is the same as the initial state of case C. In case D, the establishment of the Wi-Fi connection is not triggered by the establishment of the NFC link, but the establishment of the Wi-Fi connection is triggered by the connection operation (YES in S20 of FIG. 2) being executed on the MFP 10 and the function execution operation (S330 of FIG. 4) being executed on the mobile terminal 100.

T410, T412 are the same as T210, 212 of FIG. 6. Since the mobile terminal 100 has acquired the function information of the MFP 10 in T92 of FIG. 5, the mobile terminal 100 can display the function execution screen for selecting the print function and the scan function represented by the function information. Then, in T420, a function execution operation for selecting the print function is executed on the mobile terminal 100 (YES in S330 of FIG. 4). T430 to T452 are the same as T230 to 1252 of FIG. 6. T460 to T500 are the same as T360 to T400, with the exception of T364 of FIG. 7.

(Effect of Case D)

In a case of receiving the Invitation request (ON) from the mobile terminal 100 (T460) after the function execution operation has been executed by the user (T420 of FIG. 8), in a state where the Persistent information is being stored, the MFP 10 establishes a Wi-Fi connection with the mobile terminal 100 by using the Persistent information in the memory 34 (T470) without executing the WPS process.

Since the WPS process is omitted, the Wi-Fi connection is quickly established between the MFP 10 and the mobile terminal 100.

(Correspondence Relationship)

The MFP 10 and the mobile terminal 100 are an example of "communication device" and "external device", respectively. The NFC I/F 22, the Wi-Fi I/F 20, the memory 34 are an example of "first wireless interface", "second wireless interface", "memory", respectively. The NFC link of T20 of FIG. 5, and the NFC link of T320 of FIG. 7 are an example of "first wireless connection" and "fourth wireless connection", respectively. The Wi-Fi connection of T80 of FIG. 5 is an example of "second wireless connection". The Wi-Fi connections of T370 of FIG. 7 and T470 of FIG. 8 are examples of "third wireless connection". The Wi-Fi connections of T80 of FIG. 5 and T290 of FIG. 6 are examples of "fifth wireless connection". The Wi-Fi connection of T290 of FIG. 6 is an example of "sixth wireless connection". The Persistent information is an example of "connection information". The state where the WPS flag 40 is "OFF", and the state where the WPS flag 40 is "ON" are an example of "first operation state" and "second operation state", respectively. The WPS execution operation, and the WPS execution screen are an example of "predetermined operation" and "predetermined screen", respectively. The Invitation request (OFF), and the Invitation request (ON) are an example of "first request signal" and "second request signal", respectively. The Invitation response (NO), and the Invitation response (OK) are an example of "first response signal" and "second response signal", respectively.

Second Embodiment

In the second embodiment, the memory 34 of the MFP 10 stores an NFC flag 42 instead of the WPS flag 40. The NFC flag 42 indicates one of "ON" which means that an NFC link has been established, and "OFF" which means that an NFC link has not been established. Further, in the present embodiment, the processes of FIG. 2 and FIG. 3 differ from those in the first embodiment.

In the present embodiment, the NFC flag 42 has been set to "OFF" when the process of FIG. 2 is started. As shown in FIG. 2, the CPU 32 changes the NFC flag 42 from "OFF" to "ON" in S416, instead of executing S16 after S14.

Further, the CPU 32 executes the process of FIG. 9 instead of the process of FIG. 3. As shown in FIG. 9, in a case of YES in S112, the CPU 32 sends an Invitation response including NG information to the mobile terminal 100 in S514.

In S516, the CPU 32 determines whether the NFC flag 42 is "ON". In a case where it is determined that the NFC flag 42 is "ON" (YES in S516), the CPU 32 proceeds to S518. S518 is the same as S146 of FIG. 3, then S122 to S126 are executed. Then, in S528, the CPU 32 changes the NFC flag 42 from "ON" to "OFF". On the other hand, in a case where the NFC flag 42 is "OFF" (NO in 516), the CPU 32 executes S518 and S122 to S126 after S140 and S142. In this case, since the NFC flag 42 is "OFF", the CPU 32 does not execute S528.

(Effect of Second Embodiment)

According to the present embodiment, in the case where the MFP 10 receives an Invitation request (OFF) from the mobile terminal 100 (YES in S516 of FIG. 9) after establishment of an NFC link with the mobile terminal 100 (NFC flag=ON), the MFP 10 sends a Probe request to the mobile terminal 100 without displaying the WPS execution screen. Then, the MFP 10 executes the WPS process, and establishes a Wi-Fi connection with the mobile terminal 100. On the other hand, in the case where the MFP 10 receives an Invitation request (OFF) from the mobile terminal 100 without having established an NFC link with the mobile terminal 100 (NO in S516 of FIG. 9), the MFP 10 displays the WPS execution screen on the display unit 14 (S140) and, in a case where the WPS execution operation is executed on the MFP operation unit by the user (YES in S142), sends a Probe request to the mobile terminal 100. Then, the MFP 10 executes the WPS process, and establishes a Wi-Fi connection with the mobile terminal 100. Consequently, in the case where the MFP 10 receives the Invitation request (OFF) from the mobile terminal 100 after establishment of an NFC link with the mobile terminal 100, the MFP 10 can execute the WPS process, and establish the Wi-Fi connection with the mobile terminal 100 even if the WPS execution operation is not executed by the user on the MFP operation unit. Consequently, it is possible to improve user convenience for establishing a Wi-Fi connection between the MFP 10 and the mobile terminal 100 by using the WPS process.

(Correspondence Relationship)

The NFC link established in S10 of FIG. 2 is an example of "first wireless connection". The Wi-Fi connection established in S124 after YES in S516 of FIG. 9 is an example of "second wireless connection". The Wi-Fi connection established in S124 after NO in S516 is an example of "third wireless connection". The Probe request sent in S518 after YES in S516, and the Probe request sent in S518 after NO in S516 are an example of "first signal" and "second signal", respectively.

(Modification 1)

The CPU 32 may execute the WPS process and establish a Wi-Fi connection with the mobile terminal 100 in a state where the MFP 10 is operating as G/O. In this case, the CPU 32 shifts the MFP 10 to the G/O state, and changes the WPS flag from "OFF" to "ON" triggered by the establishment of the NFC link with the mobile terminal 100. Thereby, the MFP 10 forms the WFDNW in which the MFP 10 operates as G/O, and generates the wireless setting information (i.e., SSID, password, etc.) to be used in the WFDNW. Then, in the case of receiving a Probe request including the MAC address "AAA" from the mobile terminal 100, the CPU 32 sends a Probe response including the MAC address "AAA" to the mobile terminal 100. Then, the CPU 32 executes the WPS process, sends the wireless setting information of the WFDNW formed by the MFP 10 to the mobile terminal 100, and establishes a Wi-Fi connection with the mobile terminal 100. Thereby, the mobile terminal 100 can participate as CL in the WFDNW in which the MFP 10 operates as G/O. Consequently, the MFP 10 can execute the WPS process, and establish a Wi-Fi connection with the mobile terminal 100 even if the PBC scheme button operation is not executed.

(Modification 2)

The MFP 10 may not comprise the Persistent function. In this case, S112, S126, and S150 to S164 of FIG. 3 may be omitted. In the present modification, "store connection information", "establish a third wireless connection", "determine whether the connection information is stored in the memory" and "establish a fifth wireless connection" may be omitted.

(Modification 3)

S128 and S162 of FIG. 3 may be omitted. That is, "shift the operation state of the communication device from the second operation state to the first operation state after the WPS process for establishing the second wireless connection has been executed" and "shift the operation state of the communication device from the second operation state to the first operation state in response to receiving the second request signal from the external device" may be omitted.

(Modification 4)

There may be a configuration such that, after S130 of FIG. 3, the process of FIG. 3 ends without execution of S140 to S146 and S122 to S128. In the present modification, "shift the operation state of the communication device from the first operation state to the second operation state in a case where the predetermined operation is executed by a user", "display a predetermined screen", and "establish a sixth wireless connection" may be omitted.

(Modification 5)

"First wireless interface" may not be an I/F for executing an NFC communication, but may be, e.g., an I/F for executing a wireless communication in accordance with another communication scheme such as BlueTooth (registered trademark), infrared, TransferJet, etc.

(Modification 6)

"Communication device" may not be the MFP 10, but may be a printer capable of executing only the print function, a scanner capable of executing only the scan function, a PC, a mobile terminal, etc.

(Modification 7)

In the above embodiment, the processes of FIG. 2 to FIG. 9 are realized by the CPU 32 of the MFP 10 executing the program 36 (i.e., software). Instead, at least one process of the processes of FIG. 2 to FIG. 9 may be realized by hardware such as a logic circuit

What is claimed is:

1. A communication device comprising:
a first wireless interface;
a second wireless interface different from the first wireless interface;
a processor; and
a memory storing computer-readable instructions therein, the computer-readable instructions, when executed by the processor, causing the communication device to:
establish a first wireless connection via the first wireless interface with an external device,
in a case where the first wireless connection is established, shift an operation state of the communication device from a first operation state to a second operation state,
wherein in the first operation state, a first response signal indicating that a WPS (abbreviation of Wi-Fi Protected Setup) process is not executable is sent to the external device via the second wireless interface in a case where a first request signal requesting execution of the WPS process is received from the external device via the second wireless interface, and
wherein in the second operation state, a second response signal indicating that the WPS process is executable is sent to the external device via the second wireless interface in a case where the first request signal is received from the external device via the second wireless interface; and
establish a second wireless connection via the second wireless interface with the external device by executing the WPS process, in a case where the first request signal is received from the external device via the second wireless interface after the operation state of the communication device has been shifted to the second operation state due to the establishment of the first wireless connection with the external device.

2. The communication device as in claim 1, wherein the computer-readable instructions, when executed by the processor, further cause the communication device to:
store connection information in the memory in a case where the second wireless connection is established with the external device, the connection information being for re-establishing a wireless connection via the second wireless interface with the external device; and
establish a third wireless connection via the second wireless interface with the external device by using the connection information in the memory without executing the WPS process, in a case where a second request signal for requesting an establishment of a wireless connection using the connection information is received from the external device via the second wireless interface after the second wireless connection has been disconnected.

3. The communication device as in claim 2,
wherein the first operation state is a state where the WPS process is not executable, and the second operation state is a state where the WPS process is executable, and
wherein the computer-readable instructions, when executed by the processor, further cause the communication device to:
shift the operation state of the communication device from the second operation state to the first operation state after the WPS process for establishing the second wireless connection has been executed;
shift the operation state of the communication device from the first operation state to the second operation state in a case where a fourth wireless connection is established via the first wireless interface with the external device after the second wireless connection has been disconnected; and
shift the operation state of the communication device from the second operation state to the first operation state in response to receiving the second request signal from the external device via the second wireless interface after the operation state of the communication device has been shifted to the second operation state due to establishment of the fourth wireless connection with the external device after the second wireless connection has been disconnected,
wherein the third wireless connection via the second wireless interface is established by using the connection information in the memory without executing the WPS process, in a case where the second request signal is received from the external device via the second wireless interface after the operation state of the communication device has been shifted to the second operation state due to the establishment of the fourth wireless connection with the external device after the second wireless connection has been disconnected.

4. The communication device as in claim 3, wherein the computer-readable instructions, when executed by the processor, further cause the communication device to:
determine whether the connection information is stored in the memory in a case where the second request signal is received from the external device via the second wireless interface after the second wireless connection has been disconnected,
wherein the operation state of the communication device is shifted from the second operation state to the first operation state in a case where it is determined that the connection information is stored in the memory, and the operation state of the communication device is not shifted from the second operation state to the first operation state in a case where it is determined that the connection information is not stored in the memory, wherein the computer-readable instructions, when executed by the processor, further cause the communication device to:

establish a fifth wireless connection via the second wireless interface with the external device by executing the WPS process in the case where it is determined that the connection information is not stored in the memory.

5. The communication device as in claim 3, wherein the third wireless connection is established via the second wireless interface with the external device by using the connection information in the memory without executing the WPS process, in a case where the second request signal is received from the external device via the second wireless interface without establishing the fourth wireless connection with the external device after the second wireless connection has been disconnected.

6. The communication device as in claim 1, further comprising a display, wherein the computer-readable instructions, when executed by the processor, further cause the communication device to:

display a predetermined screen prompting to execute a predetermined operation for executing the WPS process on the display in a case where the first request signal is received from the external device via the second wireless interface without establishing the first wireless connection with the external device;

shift the operation state of the communication device from the first operation state to the second operation state in a case where the predetermined operation is executed by a user; and establish a sixth wireless connection via the second wireless interface with the external device by executing the WPS process after the operation state of the communication device has been shifted to the second operation state due to the predetermined operation.

7. The communication device as in claim 1, wherein the first wireless interface is for executing a wireless communication according to NFC (abbreviation of Near Field Communication) standard.

8. A communication device comprising:
a first wireless interface;
a second wireless interface that is different from the first wireless interface;
a display;
a processor; and
a memory storing computer-readable instructions therein, the computer-readable instructions, when executed by the processor, causing the communication device to:
receive a first request signal requesting an execution of a WPS (abbreviation of Wi-Fi Protected Setup) process from an external device via the second wireless interface;
in a case where the first request signal is received from the external device, determine whether a first wireless connection has been established via the first wireless interface with the external device, in a case where it is determined that the first wireless connection has been established:
send a first signal indicating that the WPS process is executable to the external device via the second wireless interface without displaying a predetermined screen prompting to execute a predetermined operation for executing the WPS process on the display; and
establish a second wireless connection via the second wireless interface with the external device by executing the WPS process in response to sending the first signal to the external device, and in a case where it is determined that the first wireless connection has not been established:
display the predetermined screen on the display;
send a second signal different from the first signal to the external device via the second wireless interface, in a case where the predetermined operation is executed, the second signal indicating that the WPS process is executable; and
establish a third wireless connection via the second wireless interface with the external device by executing the WPS process in response to sending the second signal to the external device.

9. The communication device as in claim 8, wherein the first wireless interface is for executing a wireless communication according to NFC (abbreviation of Near Field Communication) standard.

10. A non-transitory computer-readable recording medium storing computer-readable instructions for a communication device, wherein the computer-readable instructions, when executed by a processor of the communication device, causing the communication device to:
establish a first wireless connection via a first wireless interface with an external device;
in a case where the first wireless connection is established, shift an operation state of the communication device from a first operation state to a second operation state,
wherein in the first operation state, a first response signal indicating that a WPS (abbreviation of Wi-Fi Protected Setup) process is not executable is sent to the external device via a second wireless interface in a case where a first request signal requesting execution of the WPS process is received from the external device via the second wireless interface, and
wherein in the second operation state, a second response signal indicating that the WPS process is executable is sent to the external device via the second wireless interface in a case where the first request signal is received from the external device via the second wireless interface; and
establish a second wireless connection via the second wireless interface, which is different from the first wireless interface, with the external device by executing the WPS process, in a case where the first request signal is received from the external device via the second wireless interface after the operation state of the communication device has been shifted to the second operation state due to the establishment of the first wireless connection with the external device.

* * * * *